United States Patent [19]

Hongo et al.

[11] Patent Number: 4,641,355

[45] Date of Patent: Feb. 3, 1987

[54] PATTERN RECOGNITION APPARATUS

[75] Inventors: Yusuo Hongo; Yoshio Nitta, both of Tokyo, Japan

[73] Assignee: Fuji Electric Co., Ltd., Japan

[21] Appl. No.: 573,812

[22] Filed: Jan. 25, 1984

[30] Foreign Application Priority Data

Jan. 26, 1983 [JP] Japan ................................. 58-9806

[51] Int. Cl.[4] .............................................. G06K 9/62
[52] U.S. Cl. ....................................... 382/34; 382/30
[58] Field of Search ........................ 382/30, 33, 34, 50

[56] References Cited

U.S. PATENT DOCUMENTS

| | | | |
|---|---|---|---|
| 3,104,372 | 9/1963 | Rabinow et al. | 382/50 |
| 3,178,688 | 4/1965 | Hill et al. | 382/26 |
| 3,576,534 | 4/1971 | Steinberger | 382/34 |
| 3,601,802 | 8/1971 | Nakagome et al. | 382/34 |
| 3,618,016 | 11/1971 | Van Steenis | 382/30 |
| 3,713,099 | 1/1973 | Hemstreet | 382/30 |
| 3,846,754 | 11/1974 | Oka et al. | 382/55 |
| 4,027,284 | 5/1977 | Hoshino et al. | 382/30 |
| 4,110,737 | 8/1978 | Fahey | 382/30 |
| 4,162,482 | 7/1979 | Su | 382/55 |
| 4,183,013 | 1/1980 | Agrawala | 382/26 |
| 4,288,782 | 9/1981 | Bader et al. | 382/34 |
| 4,371,865 | 2/1983 | Moulton | 382/34 |
| 4,398,256 | 8/1983 | Nussmeier et al. | 382/41 |

OTHER PUBLICATIONS

Y. Hongo and A. Komuro, "Stamped Character Inspection Apparatus Based on the Bit Matrix Method", 1982 IEEE, pp. 448–450.
F. L. Alt, "Digital Pattern Recognition by Moments", *Optical Character Recognition*, edited by G. L. Fischer et al., Spartan Books, 1962 pp. 153–179.
W. J. Hannan, "The RCA Multi-Font Reading Machine", *Optical Character Recognition*, edited by G. L. Fischer et al., Spartan Books, 1962, pp. 3–14.
A. Komura and K. Edamatsu, "Automatic Visual Sorting Method of Compressors with Stamped Marks", 1980 IEEE, pp. 245–249.
G. A. Shippey, R. J. H. Bayley, A. S. J. Farrow, D. R. Rutovitz and J. H. Tucker, "A Fast Interval Processor", MRC Clinical and Population Cytogenetics Unit, Edinburgh, U.K. (received for publication Dec. 22, 1980), *Pattern Recognition*, vol. 14, Nos. 1–6, pp. 345–356, 1981.
D. Glucroft, "Portable Scanner Reads Handwritten Letters and Figures", McGraw-Hill World News, *Electronics*, Apr. 7, 1981.
K. Edamatsu, A. Komuro and Y. Nitta, "Application of Random Pattern Recognition Technique to Quantitative Evaluation of Automatic Visual Inspection Algorithms", 1982 IEEE, pp. 139–143.
*The American Heritage Dictionary*, Houghten Mifflin Company, Boston, Second College Edition (1982) p. 284.

*Primary Examiner*—Leo H. Boudreau
*Attorney, Agent, or Firm*—Brumbaugh, Graves, Donohue & Raymond

[57] ABSTRACT

In the particular embodiments of the invention described in the specification, a pattern recognition apparatus includes a memory for storing information relating to a known set of characters, means for defining a matrix of selected mesh pattern, means for comparing an unknown character with the known set of characters based on the mesh pattern, and means for storing information relating to the unknown character if it exceeds a selected minimum deviation from all known characters.

2 Claims, 13 Drawing Figures

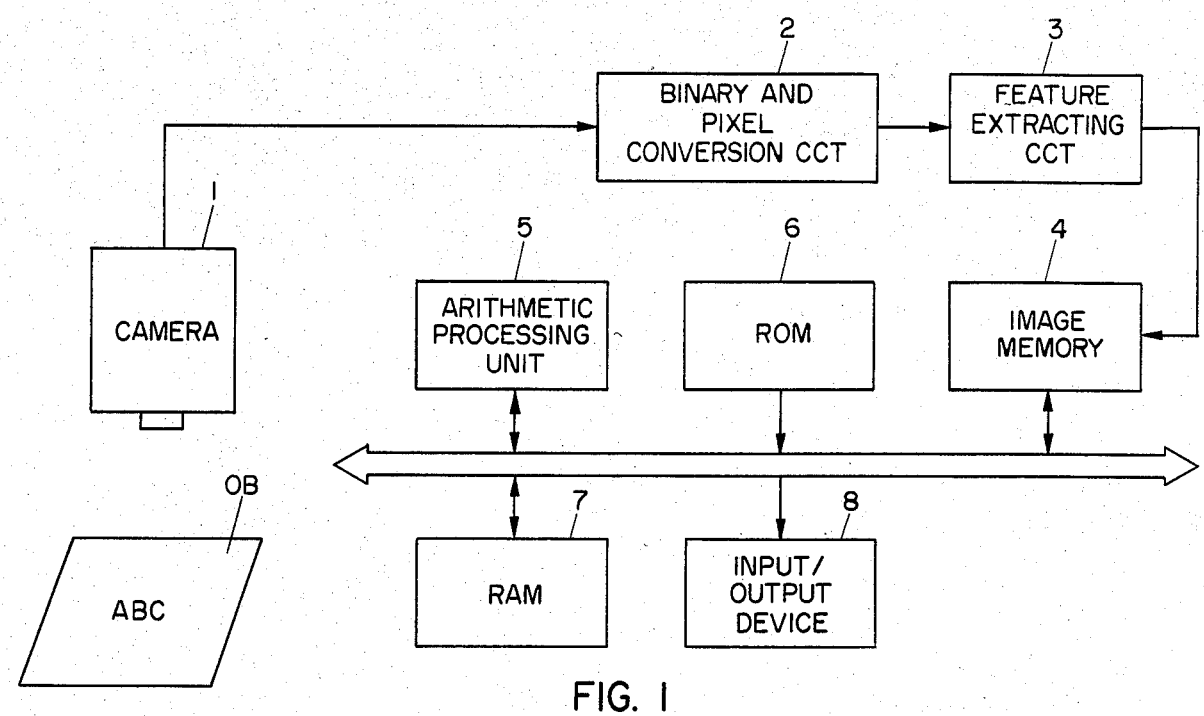
FIG. 1
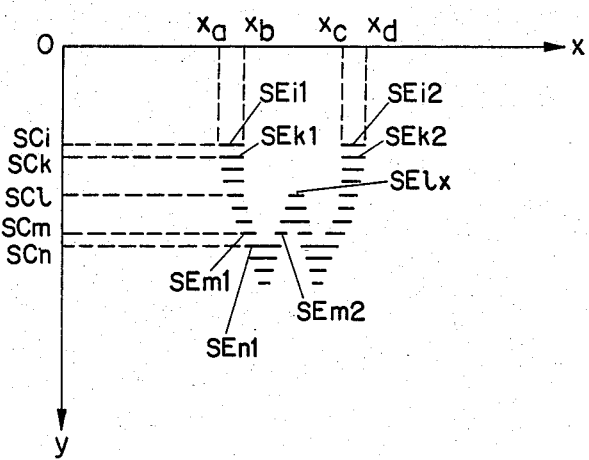
FIG. 2
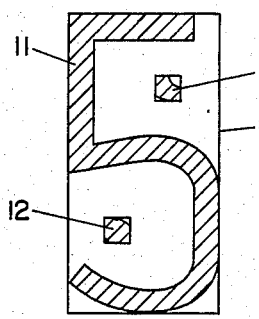    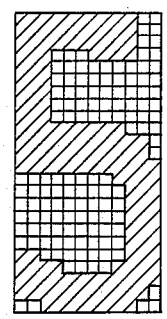    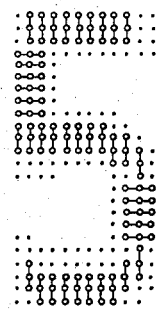
FIG. 3A           FIG. 3B           FIG. 3C

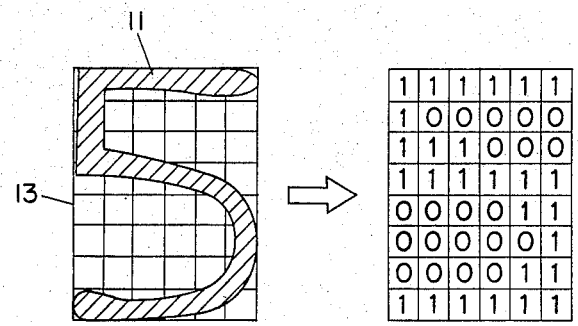
FIG. 4A         FIG. 4B
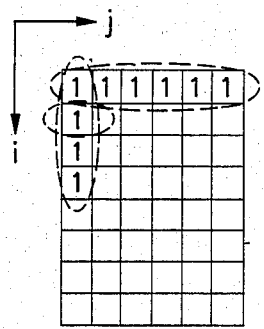    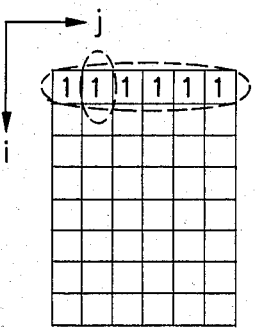    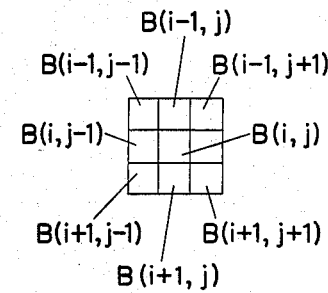
FIG. 4C         FIG. 4D         FIG. 4G
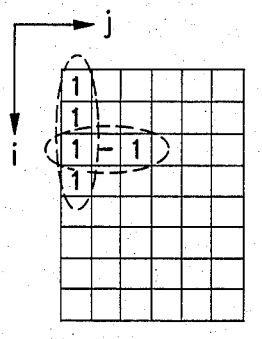    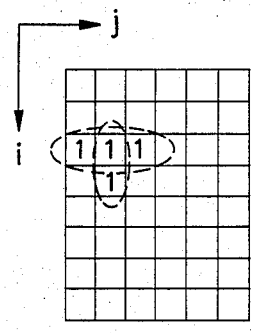    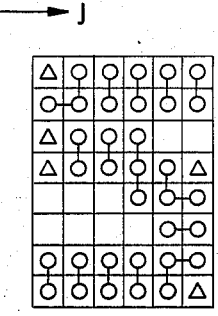
FIG. 4E         FIG. 4F         FIG. 4H

PATTERN RECOGNITION APPARATUS

BACKGROUND OF THE INVENTION

The present invention relates to a character or pattern recognition apparatus for recognizing characters or graphic patterns (hereinafter referred to as characters or character patterns) and, more particularly, to apparatus for recognizing characters through logic processing of video signals generated from the characters or character patterns by an image pickup device such as an industrial television (ITV) camera.

It is generally desirable that the pattern recognition apparatus be able to recognize characters and patterns at a high rate and accurately. The applicant has already proposed such a character recognition apparatus in commonly owned, copending U.S. application Ser. No. 504,263, now U.S. Pat. No. 4,556,985, issued on Dec. 3, 1985, which is incorporated herein by reference.

In character recognition apparatus, it is preferable to be able to design a character recognition algorithm easily, and also to easily expand the kinds of characters to be recognized. However, such an increase in the kinds of characters is not easy to achieve in conventional character recognition apparatus. This is because the settings such as the standard bit matrix $$B_S{}^K,$$

the mask bit matrix $$B_M{}^K,$$

and the deformation operator $D^K$, as described hereinafter, are limited and determined in advance according to characters to be recognized, and once they are set, they cannot be revised easily.

The present invention overcomes the foregoing shortcomings of the prior art. It is an object of the present invention to provide a character recognition apparatus which can determine and adjust parameter settings more easily, and to permit an increase in the kinds of characters to be recognized, that is, to facilitate enlargement of the settings.

SUMMARY OF THE INVENTION

In accordance with the invention, a cluster of characters of an unknown pattern is produced by effecting a predetermined operation on a bit matrix B of the unknown pattern which matrix is obtained in the conventional manner, determining minimum deviations between the cluster of characters of the unknown pattern and a group of registered cluster of characters on the basis of a stored given table, and selecting only an unknown pattern cluster of characters having minimum deviations exceeding a preset value.

BRIEF DESCRIPTION OF THE DRAWINGS

An embodiment of the present invention will be described hereinafter with reference to the accompanying drawings, in which:

FIG. 1. is a block diagram showing the overall arrangement of a conventional character recognition apparatus;

FIG. 2 is a diagramatic illustration explaining the formation of a character from segmented information;

FIG. 3A is a diagram illustrating a typical character;

FIG. 3B is a diagram showing a bit matrix for the character of FIG. 3A;

FIG. 3C is a diagram showing a clustered expression of the character of FIG. 3A; and FIGS. 4A–4H are diagrams explanatory of the operation of the character recognition apparatus of the present invention.

Illustrated in FIG. 1 is a conventional solid-state image pickup device (hereinafter referred to as a "camera" in the form of an ITV camera, an MOS transistor or a CCD (charge-coupled device) 1, a binary and pixel conversion circuit 2, a feature extracting circuit 3, an image data storage circuit 4, an arithmetic processing unit 5, a ROM (read-only memory) type memory 6 chiefly for storing a program, a RAM (random-access memory) type memory 7 chiefly for storing data, and an input and output unit 8 containing a keyboard, display and other elements, and a character or a character pattern OB to be recognized.

The character pattern is scanned by the camera 1 through repetitive scanning in a horizontal direction (x) while being vertically successively scanned in a direction (y). Time-series signals (video signals) generated by the camera are successively converted into binary values with a certain threshold level and divided into pixels (picture elements) with prescribed signals by the binary conversion circuit 2.

The image as represented by the pixels is schematically shown in FIG. 2. In this illustration, pixels representative of character patterns are expressed by a "1", pixels indicative of a background are expressed by a "0", and a series of horizontal pixels represented by "1" is called a segment. The character to be recognized can be divided into segments ($SE_{i1}$, $SE_{i2}$, ... $SE_{n1}$, ...) on horizontal scanning lines $SC_i$ through $SC_n$ as shown in FIG. 2. The character can therefore be expressed by a cluster of such segments. In order to recognize that these segments belong to the same character, it is necessary to effect coordinate comparison for each segment. For example, when the current scanning line is $SC_k$, the segment $SE_{k1}$ on the current scanning line $SC_k$ can be judged as belonging to the same pattern as that to which the segment $SE_{i1}$ on the previous scanning line $SC_i$ belongs if the Y coordinates of the segment on the current scanning line $SC_k$ is different by one from that of the segment on the previous scanning line $SC_i$ and also if the X coordinates of the segments $SE_{i1}$, $SE_{k1}$ overlap each other at least partially.

For a clear understanding of the foregoing, each segment will be classified as a start segment or a joint segment, and an overlap pointer will be introduced. A start segment does not overlap any segment on the previous scanning line, the first segment of the corresponding character portion appears on the current scanning line. The start segments are indicated by $SE_{i1}$, $SE_{i2}$, $SE_{lx}$ in FIG. 2. A joint segment overlaps a segment appearing on the previous scanning line. The joint segments are indicated at $SE_{k1}$, $SE_{m1}$, $SE_{ml}$, for example, in FIG. 2. An overlap pointer represents information indicating that a segment on the current scanning line overlaps two or more segments on the previous scanning line. Overlap pointer information is represented, for example, in the segment $SE_{n1}$ in FIG. 2. These segments, or any segment with an overlap pointer, are considered as belonging to one "unit stroke" and each such segment is given a unit stroke number. By analyzing continuity between segments with unit stroke numbers, it is determined which unit stroke belongs to which "multistroke" or character pattern.

The feature extracting circuit 3 shown in FIG. 1 extracts, from segmented information, various features such as start segments, joint segments, overlap pointers, unit stroke numbers and the number thereof, segment lengths, and coordinates of the righthand ends of segments. The arithmetic processing unit 5 determines the width $W_C$ and height $H_C$ of a pattern expressed as a cluster of segments based on the data stored in the memory 4 and the program stored in the ROM 6. The arithmetic processing unit 5 judges an object pattern as a character, for instance, when $S_C$ defined by:

$$S_C = |W_C - W_A| + |H_C - H_A|$$

meets the condition $S_C \leq S_{CU}$, where $W_A$ and $H_A$ indicate the width and height, respectively, of a circumscribing frame or search frame of a predetermined size, and $S_{CU}$ a preset upper limit.

Data processed as a cluster of segments contain not only those indicative of a character 11 as shown in FIG. 3A, but also noises 12. Therefore, the circumscribing frame 13 is established and the foregoing arithmetic operation is carried out. Any pattern is therefore normalized in size by judging it as not being a character if its size is greater or smaller than the circumscribing frame 13 with a prescribed size.

After the pattern is thus defined in size, the circumscribing frame 13 is divided into 24×12 meshes, (generally m×n) for example, as shown in FIG. 3B. By assigning "1" or "0" dependent on whether there is at least one segment in each mesh, the object pattern can be expressed as 24×12 matrix. The matrix thus defined will hereinafter be called a "bit matrix". The bit matrix contains elements (bits) which are "1" or "0" at all times and elements which change to "0" or "1". A bit matrix for each of the standard character patterns is derived in advance by first framing the standard character pattern and dividing the frame into 24×12 meshes in the above-described manner and assigning a "1" or a "0" to each mesh, depending respectively on whether or not a portion of the standard character pattern is present in the mesh. The bit matrix elements of the standard character pattern are then classified into the following four groups:

(a) pattern elements: elements which are "1" at all times;

(b) blank elements: elements which are "0" at all times;

(c) mask elements: elements which are variable between "1" and "0", i.e., the mask elements being preselected elements of the bit matrix of the standard character pattern that need not be considered ("don't care" elements) when calculating the deviation between an unknown character pattern and a standard character pattern, the mask elements of a standard character pattern being generally selected empirically either through experimentation or from prior knowledge of the general characteristics of the unknown character patterns; and, (d) deformation elements: elements constituting a deformation string (deformation class), a deformation string being a preselected string of elements representing the anticipated deformation or deviation of the unknown character from the corresponding standard character pattern, referenced from the center line of the standard character pattern, caused by variations in the line width, contour, inclination etc. from the standard character pattern, the deformation strings of a standard character pattern being generally selected empirically either through experimentation or from prior knowledge of the general variations of the unknown characters formed by a particular process.

The standard character pattern corresponding to the bit matrix of an unknown pattern shown in FIG. 3B can be expressed as shown in FIG. 3C according to the above classification process. The symbols "o", "o-o-o", ".", and blank areas are indicative respectively of deformation elements, deformation strings (deformation classes) composed of such deformation elements, mask elements, and blank elements. The expression method as illustrated in FIG. 3C is called a cluster expression, and what is thus expressed is called a cluster of characters belonging to the same or identical category. The deformation strings are to be selected in crossing relation to a center line of a character even if the character inclination and line width are varied. FIG. 3C contains no pattern elements because all pattern elements are contained in the deformation elements.

For such a cluster of characters, a standard bit matrix $$B_S^K,$$

a mask bit matrix $$B_M^K,$$

and a deformation operator $D^K(B)$ acting on an unknown pattern bit matrix B are considered. The elements $$B_S^K(i,j),$$

$$B_M^K(i,j),$$

and $D^K(B(i,j))$ of the matrices $$B_S^K, B_M^K,$$

and $D^K(B)$, respectively, are defined as follows:

$$B_S^K(i,j);$$

"1" when the element is a pattern element or a deformation element, and "0" when the element is another element;

$$B_M^K(i,j);$$

"0" when the element is a mask element and "1" when the element is another element;

$D^K(B(i,j))$; "1" when at least one of the elements of B corresponding to an element of a deformation $$B_S^K$$

of containing $$B_S^K(i,j)$$

is "1" and remains unchanged, or otherwise B(i,j). Using the quantities thus defined, a deviation of $D^K(B)$ between an unknown pattern bit matrix B and a standard or set character K is defined as follows:

$$D^K(B) = \sum_{i=1}^{M} \sum_{j=1}^{M} [B_S{}^K(i,j) \oplus \{B_M{}^K(i,j) \cdot D^K(B(i,j))\}] \quad (1)$$

where "$\oplus$" indicates exlusive ORing, "." ANDing, and "$\Sigma$" arithmetic summation, and M, N magnitudes of matrixes. In this way, a set of deviations $\{D^K(B)\}$ can be determined for all characters K (which are indicated by symbols $\forall K \epsilon \Omega$) contained in the whole set $\Omega$ of characters. Then, the character $K_0$ having the minimum deviation value $D_1$ is determined according to equation (1) and the second smallest deviation $D_2$ is also determined. If these deviations meet the conditions:

$$D_1 \leq D_U$$

$$D_2 - D_1 \geq D_L \quad (2)$$

then the unknown pattern having a bit matrix B is judged as belonging to the character $K_0$. $D^U$ and $D_L$ are preset upper and lower limits, respectively, which are experimentally determined.

In accordance with the invention a frame 13, shown in FIG. 3A, circumscribing an unknown pattern 11, is divided into M×N, e.g., (8×6 areas as shown in FIG. 4A), and a "1" or "0" is assigned to each of those areas depending upon whether there is an unknown pattern segment in the area. This produces an unknown pattern bit matrix B as illustrated in FIG. 4B. Then, the unknown pattern is expressed by a cluster from the bit matrix in the manner shown in FIG. 3C according to the following rules:

(a) The number of series of horizontal and vertical "1" elements is determined with respect to a certain element (i,j) of the bit matrix B, and attention is directed to a series $R_S$ of elements in the direction in which the number is smaller. Where the element (i,j) under consideration is judged as being already contained in a deformation string (deformation class), the process goes to a next element.

(b) Where a series of elements fewer than those in series $R_S$ is present in a group $R_{S1}, R_{S2}, \ldots$ of series of elements in a direction normal to the series $R_S$ of fewer elements, the element (i,j) under consideration is judged as a mask element. Where there is no such a series is present in the group, the series of horizontal or vertical "1" elements is judged as being a deformation string.

For example, the (1,1) element shown in FIG. 4C has a horizontal series of six and a vertical series of four. Therefore, the direction of a fewer elements, that is, the vertical direction, is the one which should receive attention. The series of elements in the direction normal to the vertical direction, i.e., the horizontal direction are then checked. Since the (2,1) element has no similar adjacent horizontal element, the (1,1) element is a mask element. The (1,2) element has no similar adjacent element in the vertical direction, and hence is a vertical element. The (2,2) element is also a vertical element. Such a relation holds true for the (1,3) through (1,6) elements (see FIG. 4D).

Likewise, the (2,1) element has no adjacent similar element in the horizontal direction, and hence is a horizontal element. So is the element (6,6). The (3,1) element is one of a horizontal series of three "1"s (deformation string) as shown in FIG. 4E, and the elements (3,2), (3,3) of the deformation string have a vertical series of two "1"s, i.e. fewer than 3. Thus, the element (3,1) is a mask element, and so is the element (4,1). Based on the same reasoning, the (4,2) through (4,4) elements are determined as being vertical deformation elements.

Since the elements (3,2) (3,3) cannot be determined by theforegoing process, deformation elements are enlarged in the following manner: For bit matrices having small mesh sizes, there is no deformation element produced which is composed of one element, but character lines of binary figures are shown irregularly, according to the foregoing classification method. In such a case, deformation elements in a bit matrix must be enlarged. The enlargement process is characterized by determining an element (i,j) under consideration as being "1" if at least one "1" element is present adjacent to the element (i,j), and can be expressed by the following equation in which a bit matrix is given as B:

$$B_E(i,j) = B(i-1,j-1) + B(i-1,j) + B(i-1,j+1) + B(i,j-1) + B(i,j) + B(i,j+1) + B(i+1,j-1) + B(i+1,j) + B(i+1,j+1)$$

where + means ORing. This relationship is more clearly seen from FIG. 4G. The above elements (3,2), (3,3) are determined by this enlargement (thickening) process. The unknown pattern bit matrix can therefore be expressed as a cluster as shown in FIG. 4H. In FIG. 4H, the symbol "$\Delta$" represents a mask element, "$\theta$" a vertical deformation element, "o-o" a horizontal deformation element, and "no symbol" a blank element. Accordingly, the term "cluster of characters" as used hereinafter and in the claims shall mean the cluster expression of an unknown or registered character pattern as described hereinabove. Where the cluster of characters is of an unregistered character pattern, it is advantageously derived by the operations on its respective bit matrix as described hereinabove in connection with FIGS. 4A-4H.

A deviation $D^{K_0}$ (K) between a character $K_0$ (a known or registered character) forming the basis of whole set of characters $\Omega$ and an unknown or unregistered character K which is to be identified is determined from the following table, which serves to find minimum deviations between unregistered characters and registered characters:

TABLE

| $K_O$ | K | Deviation |
|---|---|---|
| P | P, M, D | 0 |
|   | B | 1 |
| B | P | 1 |
|   | B, M | 0 |
|   | D | Note 1 |
| M | P, B, M, D | 0 |
| D | P, M, D | 0. |
|   | B | Note 2 | where P indicates a pattern element, B a blank element, M a mask element, and D a deformation string (of vertical and horizontal deformation elements). Thus, cluster-expressed elements of a registered character $K_0$ and an unregistered character K are compared with each other, deviations are computed individually based on the results of comparison, and the deviation between the characters is given as the sum of the individual deviations.

For example, in the above table, when the elements of the registered character $K_0$ are pattern elements P, the deviation is regarded as "0" when the elements of the unregistered character K are pattern elements P, mask elements M, or deformation strings (horizontal or vertical deformation elements) D, and as "1" when the elements of the unregistered character K are blank elements B. Deviations between the registered character $K_0$ and the unregistered character K are also determined according to the above table when the elements of the registered character $K_0$ are blank elements B, mask elements M, and deformation strings D, and the sum of the deviations is found.

"Note 1" in the table means that, when the elements of the registered character $K_0$ which correspond to the deformation string D under consideration for the unregistered character K are all blank elements B, the deviation between such elements as "1", and when the elements are other elements, the deviation is "0". "Note 2" in the table means that, when the elements of the unregistered character K which correspond to the deformation string D under consideration for the registered character $K_0$ are all blank elements B, the deviation is expressed by the number of elements constituting the deformation string, and when the elements are other elements, the deviation is "0".

A search is made for a registered character $K_0$ which has a value deviation smaller than a present value $D^{K_0}(K)$ $$D_U^{K_0}$$

among minimum deviations ($D^{K_0}(K)$, $\forall K_0 \in \Omega$) between the unregistered character K and the registered characters $K_0$, and if there is none, then the unregistered character K is judged to be a new character and is registered in a given memory. The symbol $\forall K_0 \in \Omega$ means all characters $K_0$ contained in the character set $\Omega$. If $$D_U^{K_0}(K)$$

is smaller than the present value $D^{K_0}$, then no character is registered since otherwise different settings would be made for the same character.

Thereafter, the same process as described above is repeated on an interactive or conversation basis for another sample. If there is still a registered character $K_0$ giving a mininum deviation, then preset values for the registered characters $K_0$ are established again as by reducing the size of meshes described above. Such re-establishment of the registered characters can be directed through the input device 8 illustrated in FIG. 1. Thus, when a minimum deviation of an unregistered cluster of characters to cluster of characters already registered is greater than a predetermined value, the unregistered character is allowed to be registered as a new setting. When the minimum deviation is below the predetermined value, the unregistered character is not registered since otherwise no discrimination would be possible from the characters which have already been registered.

With the present invention, as described above, bit matrices can be expressed as a cluster of characters on an interactive basis, and similar cluster of characters expressions can be searched for in registering a character cluster expression by using a table of defined minimum deviations. Therefore, no erroneous character setting is allowed, and unregistered cluster of characters can easily be registered.

The present invention is applicable to recognition of not only printed characters, but also engraved characters and ordinary line figures.

We claim:

1. A pattern recognition apparatus comprising a binary conversion means for converting signals generated from a pattern such as a character or figure recorded on a given medium into binary values, a threshold level feature extracting means for segmenting the binary pattern values and extracting features of the segments, memory means for storing extracted pieces of information and arithmetic means including means for defining a circumsquare of a given size on an unknown pattern, means for dividing said circumsquare into a plurality of meshes, means for computing a bit matrix of the unknown pattern dependent on whether a segment is present in each of the meshes, means for computing a cluster of characters of the unknown pattern by effecting a prescribed operation on the bit matrix, means for computing deviations serving as indices indicative of similarity between the cluster of characters of the unknown pattern and clusters of characters of respective registered patterns, means for registering the cluster of characters of the unknown pattern as a new cluster of characters when each one of the deviations exceeds a respective preset value, and means for preventing registration of the cluster of characters of the unknown pattern as a new cluster of characters when each one of the deviations does not exceed the respective preset value, wherein the elements of the clusters of characters of the unknown pattern and of the registered patterns are classified into pattern, blank, mask or deformation elements and the deviation between the cluster of characters of the unknown pattern and that of one of the registered patterns is computed by summing the deviations between individual elements of the cluster of characters of the unknown pattern and corresponding elements of the cluster of characters of the one of the registered patterns, where:

(a) the deviation between a pattern element and another pattern element, a mask element or a deformation element is equal to 0;
   (b) the deviation between a pattern element and a blank element is equal to 1;
   (c) the deviation between a blank element and another blank element or a mask element is equal to 0;
   (d) the deviation between a blank element and a deformation element is equal to 1, if all elements corresponding to the elements of the deformation string to which the deformation element belongs are also blank elements, and is otherwise equal to 0;
   (e) the deviation between a mask element and a pattern element, a blank element, another mask element or a deformation element is equal to 0; and
   (f) the deviation between a deformation element and a pattern element, a mask element or another deformation element is equal to 0.

2. A pattern recognition apparatus according to claim 1 including first input means for instructing said arithmetic means to designate a mesh size and second input means for registering new clusters of characters using the designated mesh size.

* * * * *